July 14, 1964    C. E. DUKE ETAL    3,140,910
ISOTROPIC RECORDING ACCELEROMETER
Filed Jan. 3, 1961

INVENTORS
CHARLES E. DUKE
HENRI B. DIAMANT

United States Patent Office 3,140,910
Patented July 14, 1964

3,140,910
ISOTROPIC RECORDING ACCELEROMETER
Charles E. Duke and Henri B. Diamant, State College, Pa.,
assignors to HRB-Singer, Incorporated, State College,
Pa., a corporation of Delaware
Filed Jan. 3, 1961, Ser. No. 80,146
4 Claims. (Cl. 346—7)

This invention relates to acceleration measuring devices generally and more particularly to an isotropic recording accelerometer which is particularly adaptable for use as a shipping shock recorder.

The growth of the modern industrial system has given rise to the need for far reaching transportation networks to facilitate the transportation of goods over long distances. As more complex devices of manufacture having high monetary value are produced, losses due to shock in handling and transporting increase far beyond the ordinary claims coverage of the shipper. Therefore, a need has arisen for a simple, inexpensive device that would measure and record shock forces suffered by cargo during transportation and handling.

The present practice of determining shipping or handling damage to freight or packages is to ascertain "obvious damage" by examining the shipping carton and its contents. The shipped item is the only criteria employed as evidence of damage, and the carrier normally restricts his liability to obvious damage. Non-visible damage is not included in the normal liability of the common carrier, and therefore the shipper or the buyer is often burdened with the costs arising from non-visible damage.

From the standpoint of the common carrier, satisfactory handling is handling which results in no obvious damage, and the risks of the carrier is therefore directly dependent upon the quality of article packing, over which he has little control. As a result, paid damage claims on the part of carriers are often extremely large and represent the difference between profit and loss in their operation. Also the usual practice of delivery carrier liability in the case of long trips involving several carriers is inequitable and conducive to carelessness on the part of all.

It is therefore obvious that both shippers and carriers would benefit from the utilization of a simple, inexpensive device capable of measuring and recording the shock forces suffered by cargo in transit. The shock measuring instruments now commercially available are generally complicated in nature and therefore expensive. Furthermore, these instruments are usually capable of recording or measuring accelerations in only one direction, and therefore, they are normally restricted in use to the measurement of the acceleration of the transporting vehicle. Because of this restricted use, shocks arising from mishandling of cargo during a loading or unloading operation go undetected. The only effective way to record the complete handling history of a package is to place a small shock measuring instrument capable of measuring shocks in all directions inside each package to be transported.

It is a primary object of this invention to provide an improved recording accelerometer adaptable for use as a shipping shock recorder.

Another object of this invention is to provide a recording accelerometer capable of recording acceleration forces upon a permanent record.

A further object of this invention is to provide an accelerometer of compact size which may be inserted within a shipping container and which is durable in nature to facilitate re-use.

A still further object of this invention is to provide a recording accelerometer capable of measuring and recording accelerations in any direction which is reliable, simple, and inexpensive.

The above and further objects and details of the invention will be readily apparent upon the consideration of the following specification taken with the accompanying drawings in which.

Figure 1:
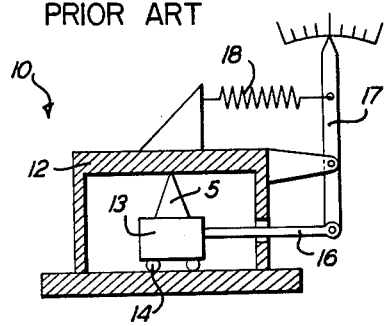
FIGURE 1 is a view in side elevation of an accelerometer of the prior art.

Referring to FIGURE 1, an accelerometer indicated generally at 10 is illustrative of the accelerometers presently available for use in shipping shock recorders. Accelerometer 10 includes a base 11 and a frame unit 12 which substantially encloses a mass 13. Mass 13 is mounted upon rollers 14 and is provided with a projecting section 15 which contacts the frame unit 12 so that the mass is permitted to move in only a horizontal direction. The mass is connected by suitable linkage means 16 to a pivoted pointer or indicator 17 which is, in turn, biased by a spring 18. The placement of the spring is not essential, but the spring must be arranged so that the motion of the mass will deflect the spring to cause an indication.

Figure 2:
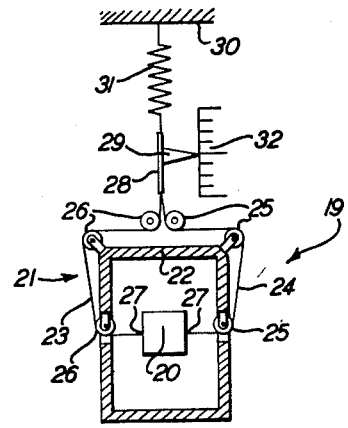
FIGURE 2 is a simplified diagrammatic representation of the accelerometer of the present invention.

Referring now to FIGURE 2, the accelerometer utilized by the present invention, indicated generally at 19, comprises a mass 20 which is completely suspended by a flexible suspension unit 21 so as to be movable in all directions relative to a frame structure 22. The suspension unit 21 includes elongated flexible strands 23 and 24 of wire, cord, or other suitable material. Suspension strands 23 and 24 are threaded about a plurality of pulleys 25 and 26 which are suitably mounted upon the frame unit 22 or upon the casing of the instrument (not shown). The strands 23 and 24 are connected at one end 27 centrally of the mass 20 and at the opposite end 28 to a pointer 29. Extending between the pointer 29 and a suitable stationary mounting 30 is a spring 31 which, when deflected, permits the pointer to move along an indicating scale 32.

In the operation of the accelerometer 19 of FIGURE 2, it is obvious that by a suitable connection with the flexible strands 23 and 24, it is possible to deflect the spring 31 by motion of the mass 20 in any direction. In the measurement of acceleration, the direction or absolute magnitude of the mass motion is not of concern, but the magnitude of the force developed is the factor to be measured. This force, which represents the vector sum of the forces of acceleration applied to the accelerometer 19, is developed at the spring 31, and, neglecting the friction in the pulleys 25 and 26 (which shall be minimized), is transmitted to the mass 20 by the strands 23 or 24 or both. Therefore, an acceleration in either the horizontal or vertical direction will result in the same net movement of the pointer, even though the mass 20 will move a greater distance in the case of a vertical acceleration. As the mass 20 moves, tension is applied to the strands 23 and/or 24 causing the pointer 29 to move against the action of the spring 31 and provide an indication relative to the scale 32.

Figure 4:
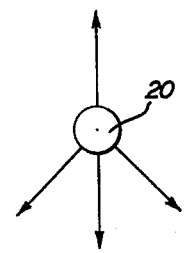
FIGURE 4 is a diagrammatic representation of an alternate suspension system for the accelerometer of the present invention.

Although the magnitude of the mass excursion does not proportionally affect the deflection of the spring 31, it may be desirable to make the excursions more uniform in all directions. This can be accomplished by employing more suspension strands as illustrated in FIGURE 4. As shown by FIGURE 4, four strands arranged in a tetrahedron fashion and all connected between the mass 20 and the same spring would provide more uniform movement of the mass in all directions. Alternatively, six strands in cubicle arrangement or various like modifications of the flexible strands which comprise the flexible suspension unit 21 of FIGURE 2 would further unify the excursion of the mass 20. Any such modification is within the scope of this invention.

Figure 3:
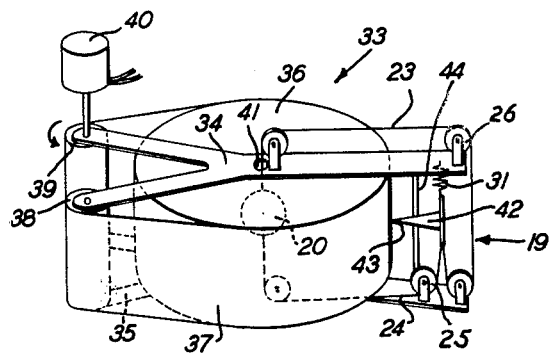
FIGURE 3 is a perspective view of the recording accelerometer of the present invention.

FIGURE 3 provides an illustration of the recording accelerometer of the present invention, indicated generally at 33, which embodies the accelerometer 19 of FIGURE 2. Recording accelerometer 33 includes a pair of parallel extending frame members 34 and 35. Mounted between the frame members 34 and 35 is a cylindrical casing 36. A paper record sheet 37 is moved from a supply roller 38 about the external periphery of the cylinder 36 to a paper take-up roll 39. Paper rolls 38 and 39 are mounted at one end between the frame units 34 and 35. The cylindrical casing 36 may be rotatably mounted between the frame units 34 and 35 so as to be driven by the movement of the paper record sheet 37. Take-up roll 39 is driven by a clock mechanism 40 which may be mounted upon the frame unit 34. Clock unit 40 might include a simplified spring clock mechanism or it would be feasible to power this unit with an electrically wound mechanism energized by small, long-life mercury cells.

The accelerometer 19 of FIGURE 2 is supported by the frame units 34 and 35 at the end opposite to the paper rollers 38 and 39. Mass 20 is suspended within the casing 36 by the flexible supporting strands 23 and 24 which extend through apertures 41 provided in the frame units 34 and 35 and the cylindrical casing 36. The strands 23 and 24 run from the mass 20, around the pulleys 25 and 26 which are mounted upon the frames 34 and 35, to one side of the upper portion of a scriber unit 42. Spring 31 extends between the opposite upper corner of the scriber unit 42 and the frame unit 34. Scriber unit 42 is mounted so as to be capable of longitudinal movement along a bar 44 which extends between the frame units 34 and 35. The lower portion 43 of the scriber unit 42 contains a suitable marking material which contacts the surface of the record strip 37.

In the operation of the recording accelerometer of FIGURE 3, the clock mechanism 40 drives the recording strip 37 about the cylindrical casing 36 at a desired rate. Any shock experienced by the instrument causes a movement of the mass 20 within the casing 36 and a subsequent deflection of the spring 31. This deflection is accomplished by transmitting the force of the shock through the flexible strands 23 and 24 to the scriber 42, and therefore, movement of the mass 20 causes the scriber 42 to move along the bar 44. The marking point 43 of the scriber contacts the surface of the recording strip 37 and transcribes thereupon a record of all shocks experienced by the instrument.

It will be readily apparent to those skilled in the art that this invention provides a novel and improved shock recording accelerometer of simplified construction and compact size. Arrangement and types of components utilized within this invention may be subject to numerous modifications well within the purview of this inventor who intends only to be limited to a liberal interpretation of the specification and appended claims.

What is claimed is:

1. A recording accelerometer comprising a frame, suspension means mounted upon said frame, said suspension means including a plurality of pulleys mounted upon said frame and a plurality of elongated flexible strands extending about said pulleys, a mass freely suspended within said frame by said flexible strands for freedom of movement in all directions, and an indicating means mounted upon said frame, said flexible strands being operatively connected to said indicating means.

2. A recording accelerometer comprising a frame, suspension means mounted upon said frame, said suspension means including a plurality of pulleys mounted upon said frame and a plurality of elongated flexible strands extending about said pulleys, a mass freely suspended within said frame by said flexible strands for freedom of movement in all directions in response to external forces applied to said frame, an indicating means mounted upon said frame, and spring means extending between said frame and said indicating means, said flexible strands being operatively connected to said indicating means to cause said indicating means to move against the bias of said spring means to provide a single indication representative of said external forces.

3. A recording accelerometer comprising a frame, a cylindrical hollow casing mounted upon said frame, suspension means provided upon said frame, said suspension means including a plurality of pulleys mounted upon said frame and a plurality of elongated flexible strands extending about said pulleys and into said cylindrical casing, a mass freely suspended within said cylindrical casing by said flexible strands for freedom of movement in all directions in response to external forces applied to said frame, and recording means mounted upon said frame, said recording means including supply and take-up reels for recording media provided at one end of said frame, a strip of recording media extending between said supply and take-up reels about said cylindrical casing, and a recording instrument mounted at the opposite end of said frame in contact with said strip of recording media, said recording instrument being operatively connected to said elongated suspension strands whereby indications representative of said external forces are inscribed by said recording instrument upon said strip of recording media.

4. A recording accelerometer comprising a frame, a cylindrical hollow casing mounted centrally upon said frame, suspension means provided upon said frame, said suspension means including a plurality of pulleys mounted upon said frame and a plurality of elongated flexible strands extending about said pulleys and into said cylindrical casing, a mass freely suspended within said cylindrical casing by said flexible strands for freedom of movement in all directions in response to external forces applied to said frame, and a recording means mounted upon said frame, said recording means including supply and take-up reels provided at one end of said frame, said take-up reel being provided with a motor drive unit, a paper record strip extending between said supply and take-up reels about said cylindrical casing, a scriber mounted at the opposite end of said frame in contact with said paper record strip, and spring means extending between said frame and said scriber, said scriber being operatively connected to said flexible suspension strands whereby said scriber is caused to move against the bias of said spring means to provide indications representative of said external forces upon said recording strip.

References Cited in the file of this patent

UNITED STATES PATENTS

| 1,869,828 | Shrader | Aug. 2, 1932 |
| 2,537,858 | Richard | Jan. 9, 1951 |
| 2,564,705 | Maynard | Aug. 21, 1951 |

FOREIGN PATENTS

| 25,186 | Great Britain | 1901 |